US007986327B1

(12) United States Patent
Edmondson

(10) Patent No.: US 7,986,327 B1

(45) Date of Patent: Jul. 26, 2011

(54) SYSTEMS FOR EFFICIENT RETRIEVAL FROM TILED MEMORY SURFACE TO LINEAR MEMORY DISPLAY

(75) Inventor: John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 594 days.

(21) Appl. No.: 11/552,082

(22) Filed: Oct. 23, 2006

(51) Int. Cl.

| | |
|---|---|
| ***G06F 12/10*** | (2006.01) |
| ***G06F 13/00*** | (2006.01) |
| ***G06F 13/28*** | (2006.01) |
| ***G06F 9/26*** | (2006.01) |
| ***G06F 9/34*** | (2006.01) |

(52) U.S. Cl. ......................... 345/569; 711/153; 711/209

(58) Field of Classification Search ........... 345/530–574
See application file for complete search history.

(56) References Cited

U.S. PATENT DOCUMENTS

| | | | | |
|---|---|---|---|---|
| 5,247,632 | A | 9/1993 | Newman | |
| 5,426,750 | A | 6/1995 | Becker et al. | |
| 6,104,417 | A * | 8/2000 | Nielsen et al. | 345/542 |
| 6,487,575 | B1 | 11/2002 | Oberman | |
| 2003/0169265 | A1 | 9/2003 | Emberling | |
| 2005/0237329 | A1 * | 10/2005 | Rubinstein et al. | 345/531 |
| 2006/0129786 | A1 | 6/2006 | Yamazaki | |

OTHER PUBLICATIONS

Final Office Action, U.S. Appl. No. 11/555,628, dated Aug. 13, 2009.
Office Action, U.S. Appl. No. 11/555,628, mailed Nov. 30, 2009.

* cited by examiner

*Primary Examiner* — Kee M Tung
*Assistant Examiner* — Carlos Perromat
(74) *Attorney, Agent, or Firm* — Patterson & Sheridan, LLP

(57) ABSTRACT

Embodiments of the present invention set forth a technique for optimizing the on-chip data path between a memory controller and a display controller within a graphics processing unit (GPU). A row selection field and a sector mask are included within a memory access command transmitted from the display controller to the memory controller indicating which row of data is being requested from memory. The memory controller responds to the memory access command by returning only the row of data corresponding to the requested row to the display controller over the on-chip data path. Any extraneous data received by the memory controller in the process of accessing the specifically requested row of data is stripped out and not transmitted back to the display controller. One advantage of the present invention is that the width of the on-chip data path can be reduced by a factor of two or more as a result of the greater operational efficiency gained by stripping out extraneous data before transmitting the data to the display controller.

16 Claims, 5 Drawing Sheets

SYSTEMS FOR EFFICIENT RETRIEVAL FROM TILED MEMORY SURFACE TO LINEAR MEMORY DISPLAY

BACKGROUND OF THE INVENTION

1. Field of the Invention

Embodiments of the present invention generally relate to DRAM (dynamic random access memory) controller systems and, more specifically, to systems for efficient retrieval from tiled memory surface to linear memory display.

2. Description of the Related Art

Modern graphics processor units (GPUs) commonly arrange data in memory to have two-dimensional (2D) locality. More specifically, a linear sequence of 256 bytes in memory, referred to herein as a "group of blocks" (GOB), may represent four rows and sixteen columns in a 2D surface residing in memory. As is known in the art, organizing memory as a 2D surface improves access efficiency for graphics processing operations that exhibit 2D locality. For example, the rasterization unit within a GPU tends to access pixels within a moving, but localized 2D region in order to rasterize a triangle within a rendered scene. By organizing memory to have 2D locality, pixels that are localized within a given 2D region are also localized in a linear span of memory, thereby allowing more efficient memory access.

While structuring memory to accommodate 2D locality benefits many of the graphics processing operations included in the GPU, certain other types of access patterns generated within the GPU are oftentimes made less efficient. The display controller within the GPU, for example, typically accesses only one row of data from memory at a time. Each such row normally spans multiple GOBS in the horizontal dimension. However, the memory controller within the GPU typically reads two or more rows of data from memory at a time when a GOB is accessed. Thus, when the display controller requests data from the memory controller for one specific row of data, the memory controller actually reads two or more rows of data to fulfill the read request. As a result, the data path between the memory controller and the display controller must be sized to accommodate the additional bandwidth associated with the extra data read from memory by the memory controller even though this extra data is discarded by the display controller and not used. Die area is consequently wasted since the data channel ends up carrying unused data.

One potential solution to this problem includes adding a data buffer to the display controller so that the otherwise discarded data is instead buffered in the display controller for use in a subsequent display line. While this solution may improve overall memory use since each row of data is read from memory only once and no data is discarded, the data path between the memory controller and the display controller must still be large enough to carry the multiple rows of data read from memory by the memory controller. Thus, this solution adds the expense of an on-chip data buffer without decreasing the expense of the data path between the memory controller and the display controller.

As the foregoing illustrates, what is needed in the art is a way to optimize the size of the on-chip data path between the memory controller and the display controller within a GPU.

SUMMARY OF THE INVENTION

One embodiment of the present invention sets forth a graphics processing unit with an optimized data channel. The graphics processing unit that includes a memory controller coupled to a local memory and configured to access data from the local memory, and a display controller coupled to the memory controller and configured to access data from the local memory for display. The display controller is further configured to transmit a read request to the memory controller to access a first row of data from the local memory, the read request including a command field, a row field, an address field and a sector field. In another embodiment, the graphics processing unit further includes a data path that couples the memory controller to the display controller, where the memory controller is configured to transmit data read from the local memory to the display controller through the data path. The data path is sized such that only one row of data read from the local memory may be transmitted through the data path at time.

One advantage of the disclosed graphics processing unit is that that the width of the on-chip data path can be reduced by a factor of two or more relative to prior art systems as a result of the greater operational efficiency gained by stripping out extraneous data before transmitting the data to the display controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
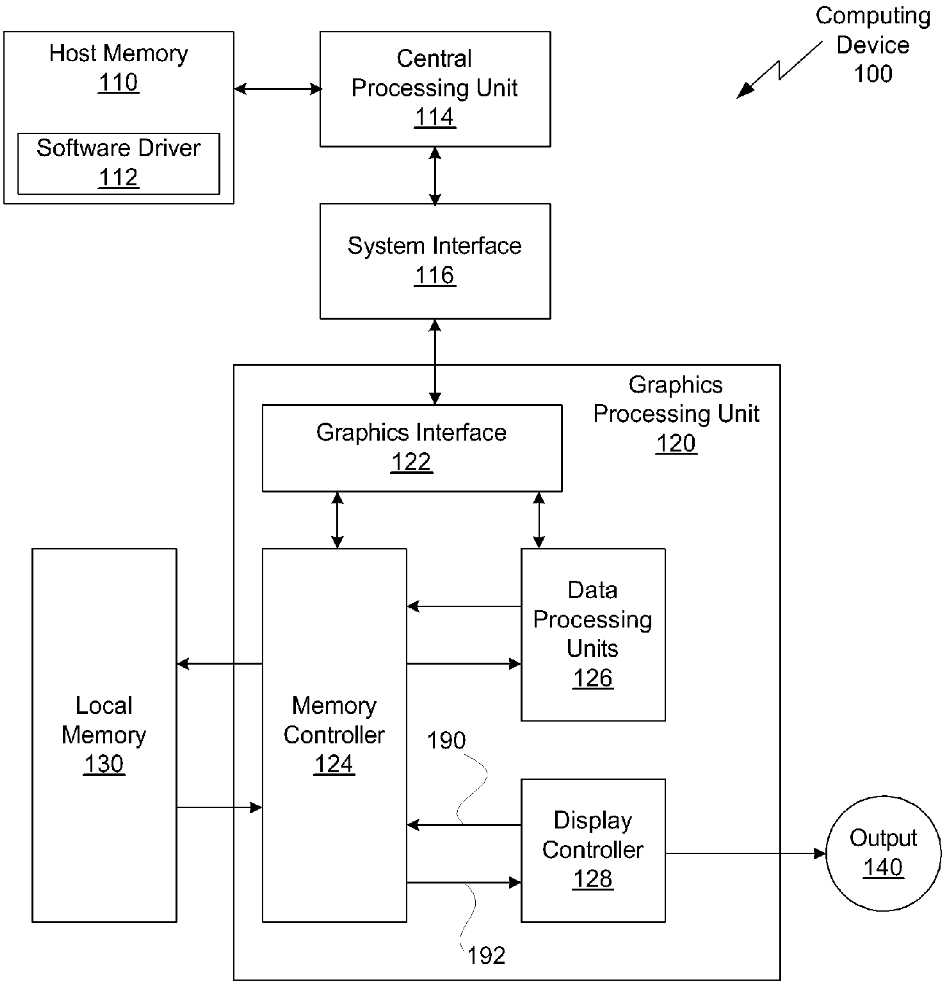
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 114 connected to a host memory 110 and a system interface 116. A graphics processing unit (GPU) 120 is coupled to the CPU 114 through the system interface 116. A software driver 112 for the GPU 120 is stored in the host memory 110 and executes on the CPU 114. The GPU 120 is coupled to a local memory 130 and an output 140. The local memory 130 may include dynamic random access memory (DRAM) or any other suitable type of memory technology.

The output 140 data stream connects to a graphics output device (not shown), such as a liquid crystal display (LCD), and provide graphics frames for display.

The internal architecture of the GPU 120 includes, without limitation, a graphics interface 122, a memory controller 124, a set of one or more data processing units 126, and a display controller 128. The graphics interface 122 is used to couple the data processing units 126 and memory controller 124 within the GPU 120 to the system interface 116. The data processing units 126 receive and process commands transmitted by the software driver 112 to the GPU 120 via the system interface 116 and graphics interface 122. The data processing units 126 access the local memory 130 to store and retrieve data, where each memory access transaction is conducted through the memory controller 124. The display controller 128 also accesses local memory 130 through the memory controller 124 to retrieve frames of data, one row of data at a time. Each row of data in a particular display frame is then transmitted to the output 140.

The display controller 128 transmits read requests for data stored in local memory 130 to the memory controller 124 via a request command path 190 disposed between the display controller 128 and the memory controller 124. As described in greater detail below, the specific format of these read requests enables the memory controller 124 to access data corresponding to a horizontal span within a single row of a 2D surface within local memory 130. The memory controller 124 then transmits the requested data back to the display controller 128 via a data path 192.

Figure 2:
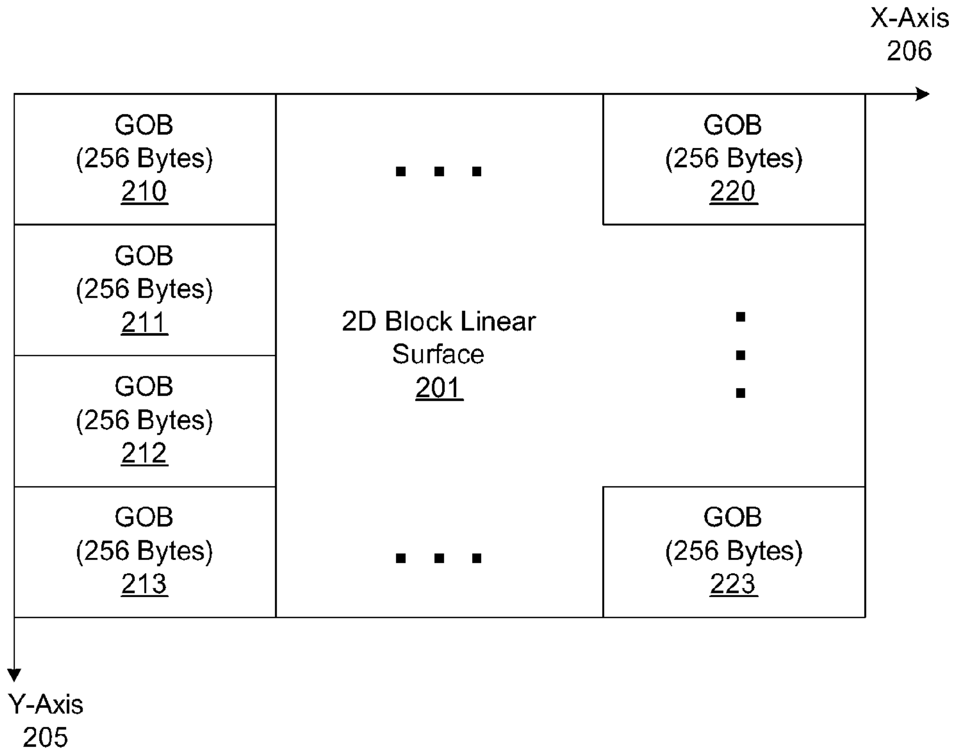
FIG. 2 is a conceptual illustration of a 2D block linear surface, according to one embodiment of the present invention.

FIG. 2 is a conceptual illustration of a 2D block linear surface 201, according to one embodiment of the present invention. As described in further detail below in FIGS. 3A and 3B, each 256 byte GOB designates a region within the 2D block linear surface 201 made up of four rows of data, where each row of data represents a row of surface pixels. The number of columns of data within a GOB is a function of the specific format of the surface pixels making up the 2D block linear surface 201. For example, a surface pixel format that uses four bytes per pixel results in a GOB having sixteen columns of data, where each column of data is one pixel wide. Using one or more tiling patterns, the GOBs may be assembled into larger surfaces to form a variety of possible surface sizes. For example, as shown, GOBs 210, 211, 212 and 213 are assembled vertically to cover the vertical extent of the 2D block linear surface 201. As also shown, GOB 220 includes the top four rows of data and the right-most columns of data making up the 2D block linear surface 201. By contrast, GOB 223 includes the bottom four rows of data and the right-most columns of data making up the 2D block linear surface 201. As is well-known, when accessing a specific location within the 2D block linear surface 201 along an x-axis 206 and a y-axis 205, the GOB tiling pattern is taken into account to select a specific GOB within the 2D block linear surface 201, and the surface pixel format is taken into account to locate a specific pixel within the selected GOB.

Figure 3A:
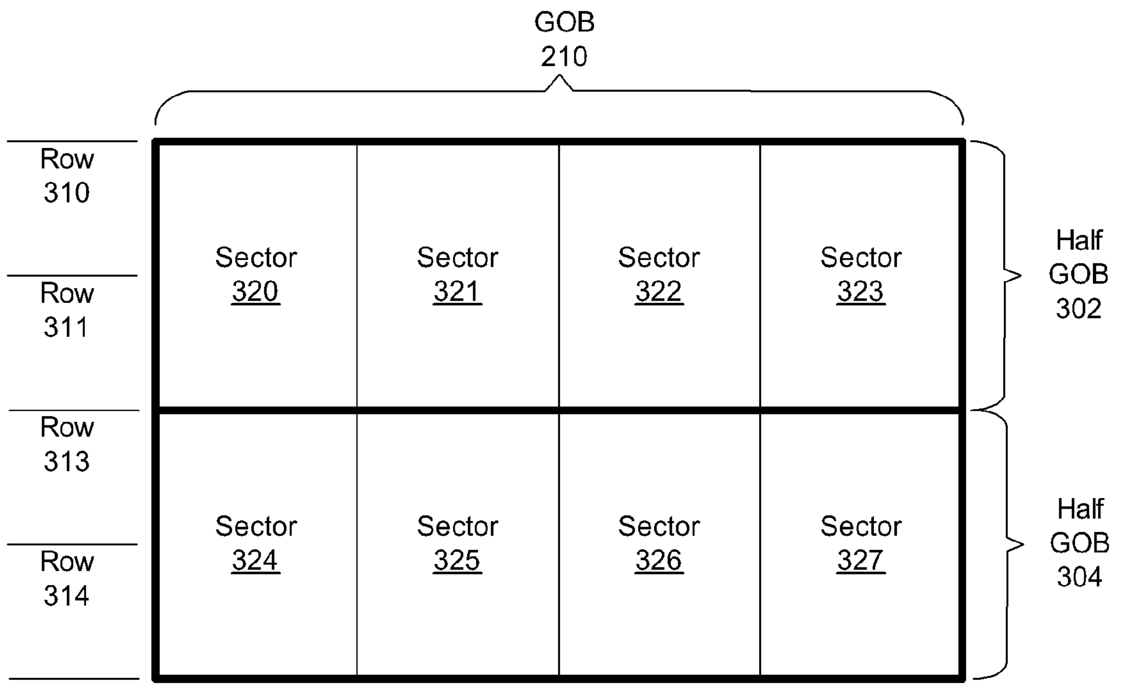
FIGS. 3A and 3B are conceptual illustrations of the organization of a memory GOB, according to one embodiment of the present invention.
Figure 3B:
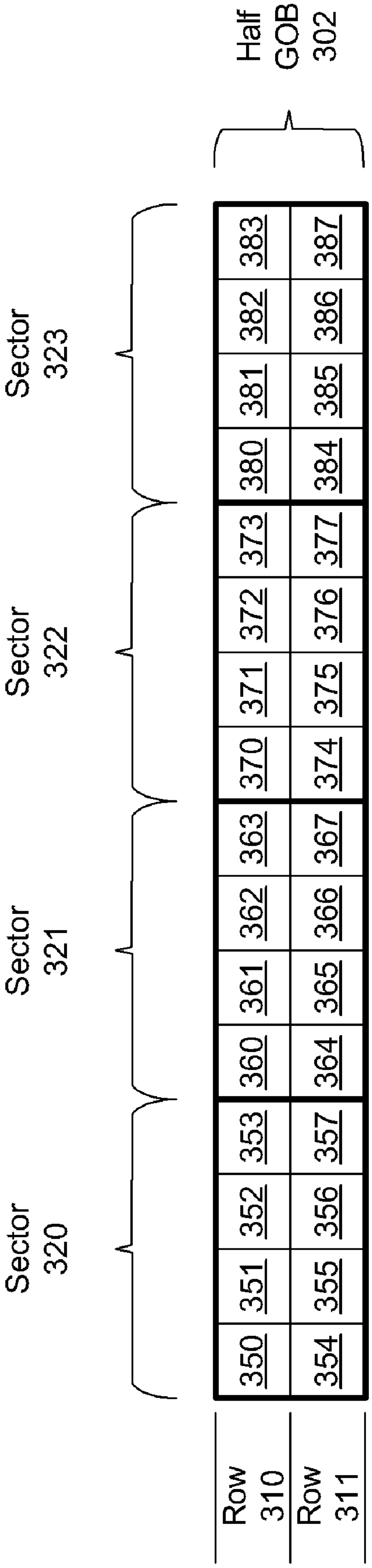

FIGS. 3A and 3B are conceptual illustrations of the specific organization of GOB 210 of FIG. 2, according to one embodiment of the present invention. In FIG. 3A, GOB 210 includes two half GOBs 302, 304. Each half GOB includes four thirty-two byte sectors, where each sector is made of two rows of data. As shown, half GOB 302 includes sectors 320, 321, 322 and 323, all of which are spanned by data rows 310 and 311. Likewise, half GOB 304 includes sectors 324, 325, 326 and 327, all of which are spanned by data rows 313 and 314. Each thirty-two byte sector corresponds to the minimum unit of data the memory controller 124 reads when accessing data from the local memory 130. Importantly, each of the thirty-two byte sectors accessed by the memory controller 124 includes two sixteen byte rows of data.

FIG. 3B shows an expanded view of half GOB 302 of FIG. 3A. With a four byte surface pixel format, each thirty-two byte sector 320, 321, 322 and 322 includes a four-by-two array of pixels. For example, as shown, sector 320 includes pixels 350, 351, 352, 353, 354 355, 356 and 357; sector 321 includes pixels 360, 361, 362, 363, 364 365, 366 and 367; sector 322 includes pixels 370, 371, 372, 373, 374 375, 376 and 377; and sector 323 includes pixels 380, 381, 382, 383, 384 385, 386 and 387.

The display controller 128 of FIG. 1 is configured to request a complete row of data within the 2D block linear surface 201 of FIG. 2 before progressing to the next row of data. For example, referring to FIG. 3B, the display controller 128 first requests data row 310, which traverses sectors 320, 321, 322 and 323, before progressing to data row 311. More specifically, the display controller 128 first requests pixels 350 through 353, since these pixels make up data row 310 of the first sector 320, then requests pixels 360 through 363, since these pixels make up data row 310 of the second sector 321, then requests pixels 370 through 373, since these pixels make up data row 310 of the third sector 322, and then requests pixels 380 through 383, since these pixels make up data row 310 of the fourth sector 323. Once the pixels that form row 310 have all been read, the display controller 128 proceeds to data row 311. In the beginning of data row 311, the display controller 128 requests pixels 354 through 357, since these pixels make up data row 311 of the first sector 320, then requests pixels 364 through 367, since these pixels make up data row 311 of the second sector 321, etc. However, as previously described herein, when reading each set of four pixels from a particular sector to fulfill a read request from the display controller 128, the memory controller 124 also reads the other four pixels within the sector from the local memory 130 because a complete thirty-two byte sector is the minimum unit of access available to the memory controller 124. Therefore, for example, when reading pixels 350 through 353 from sector 320 to display data row 310, the memory controller 124 is forced to read pixels 354 through 357 within sector 320 from the local memory 130. However, as set forth in greater detail herein, the format of the read requests transmitted by the display controller 128 to the memory controller 124 may be modified to inform the memory controller 124 of the specific pixel data within a sector that the display controller 128 needs to display a given row of data. With this information, the memory controller 124 is able to transmit to the display controller 128 only the pixel data included in the row of data that the display controller 128 is currently displaying. Thus, no superfluous data is transmitted to the display controller 128 over the data path 192, which allows the data path 192 to be reduced in size.

Figure 4A:
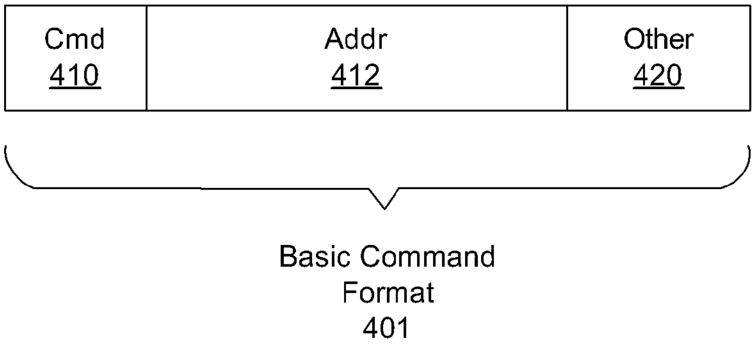
Figure 4A (Prior Art)
FIGS. 4A and 4B are conceptual illustrations of the basic command format and the enhanced command format, respectively, for memory accesses transmitted by the display controller of FIG. 1, according to one embodiment of the present invention.
Figure 4B:
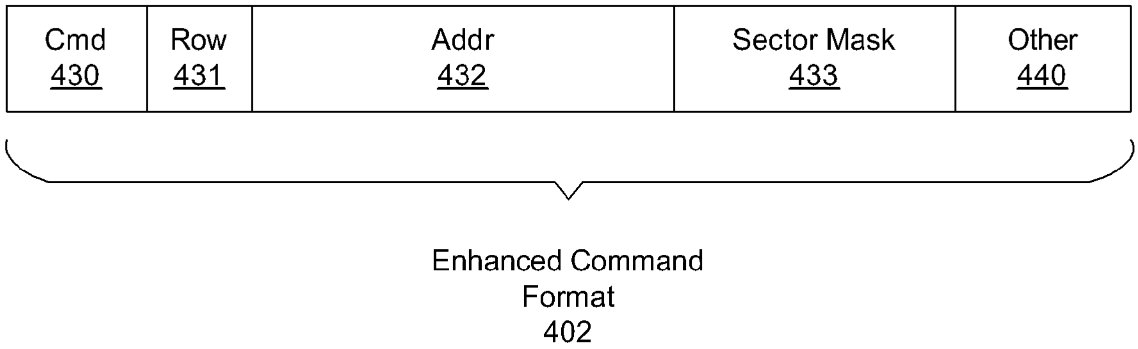

FIGS. 4A and 4B are conceptual illustrations of the basic command format and the enhanced command format, respectively, for memory accesses transmitted by the display controller 128, according to one embodiment of the present invention. In FIG. 4A, a basic prior art command format 401 includes a command (Cmd) field 410, an address (Addr) field 412 and an "other" 420 field. The command field 410 indicates the type of memory access being requested by the display controller 128, such as a read or write request. The address field 412 sets forth the address of the GOB within the local memory 130 that the display controller 128 wants to access. For example, the command field 410 and the address field 412 can be set such that a GOB of data is read from the local memory 130 at the location specified in the address field 412. The "other" field 420 is outside the scope of the present invention.

In FIG. 4B, an enhanced command format 402 includes, without limitation, a command (Cmd) field 430, a row field 431, an address (Addr) field 432, a sector mask 433 and an "other" 440 field. The command field 430 indicates the type of memory access being requested by the display controller 128. Again, the address field 432 sets forth the address of the GOB of data within the local memory 130 that the display controller 128 wants to access. The row field 431 designates one of two rows of data associated with a half GOB that the display controller 128 wants to access. The sector mask 433 designates which of the eight sectors within a GOB the display controller 128 wants to access. Importantly, the intersection of the selected GOB, given in the address field 432, the selected sector, given in the sector mask 433, and the selected row, given in the row field 431, defines a specific row of pixel data within a particular sector of the 2D block linear surface 201 of FIG. 2 that the display controller 128 wants to access. The memory controller 124 uses the selection of the specific row of data within a sector to selectively transmit data to the display controller 128 via data channel 192 and to selectively discard the other row of data within the sector automatically read by the memory controller 124.

In sum, the memory controller 124 within the GPU 120 is configured to return only the data related to a specifically requested row of data over the on-chip data path 192 between the memory controller 124 and display controller 128. Any additional data returned from local memory 130 to the memory controller 124 is stripped out by the memory controller 124 and not transmitted to the display controller 128. As a result, the width of the data path 192 is reduced by at least a factor of two, enabling a reduction in total die area for the GPU 120. Furthermore, the basic command format 401 used to request memory accesses is extended in the enhanced command format 402 to include the row field 431 and the sector mask 433. The combination of the sector mask 433 and the row field 431 identifies which row of data within a particular sector of a GOB is being requested by the display controller 128. This information enables the memory controller 124 to transmit only the specifically requested data to the display controller 128 and to discard any other data read from the local memory 130.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense.

I claim:

1. A graphics processing unit, comprising:

a memory controller coupled to a local memory and configured to access data from the local memory that is organized within the local memory as one or more groups of blocks (GOBs), wherein each GOB includes eight sectors and four rows of data such that each row of data traverses four of the eight sectors; and a display controller coupled to the memory controller and configured to access data from the local memory for display, wherein the display controller is further configured to transmit a read request to the memory controller to access a first row of data from the local memory, the read request including a command field, a row field, an address field and a sector field, and wherein the command field indicates a read or write memory access, the address field specifies a GOB within the local memory, the sector field specifies a sector within the GOB, and the row field specifies a row within the GOB, the sector being a vertical portion of the GOB and the row being a horizontal portion of the GOB.

2. The graphics processing unit of claim 1, wherein the memory controller is configured to also read a second row of data from the local memory in response to the read request and to transmit only the first row of data back to the display controller.

3. The graphics processing unit of claim 2, wherein the memory controller is configured to discard the second row of data read from the local memory.

4. The graphics processing unit of claim 2, further comprising a data path that couples the memory controller to the display controller, wherein the memory controller is configured to transmit data read from the local memory to the display controller through the data path, and the data path is sized such that only one row of data read from the local memory may be transmitted through the data path at a time.

5. The graphics processing unit of claim 1, wherein the first row of data includes four pixels, and each pixel is represented using four bytes.

6. The graphics processing unit of claim 1, wherein the intersection of the GOB, the sector within the GOB, and the row within the sector specifies the location of the data within the local memory for display.

7. A computing device, comprising:

a host memory;

a central processing unit coupled to the host memory; and a graphics processing unit coupled to the central processing unit through a system interface, the graphics processing unit having:

a memory controller coupled to a local memory and configured to access data from the local memory that is organized within the local memory as one or more groups of blocks (GOBs), wherein each GOB includes eight sectors and four rows of data such that each row of data traverses four of the eight sectors, and a display controller coupled to the memory controller and configured to access data from the local memory for display, wherein the display controller is further configured to transmit a read request to the memory controller to access a first row of data from the local memory, the read request including a command field, a row field, an address field and a sector field, and wherein the command field indicates a read or write memory access, the address field specifies a GOB within the local memory, the sector field specifies a sector within the GOB, and the row field specifies a row within the GOB, the sector being a vertical portion of the GOB and the row being a horizontal portion of the GOB.

8. The computing device of claim 7, wherein the memory controller is configured to also read a second row of data from the local memory in response to the read request and to transmit only the first row of data back to the display controller.

9. The computing device of claim 8, wherein the memory controller is configured to discard the second row of data read from the local memory.

10. The computing device of claim 8, further comprising a data path that couples the memory controller to the display controller, wherein the memory controller is configured to transmit data read from the local memory to the display controller through the data path, and the data path is sized such that only one row of data read from the local memory may be transmitted through the data path at a time.

11. The computing device of claim 7, wherein the first row of data includes four pixels, and each pixel is represented using four bytes.

12. The computing device of claim 7, wherein the intersection of the GOB, the sector within the GOB, and the row within the sector specifies the location of the data within the local memory for display.

13. A display controller configured to transmit a read request to a memory controller to access a first row of data from a local memory coupled to the memory controller, wherein the data is organized within the local memory as one or more groups of blocks (GOBs), wherein the GOB includes eight sectors and four rows of data such that each row of data traverses four of the eight sectors, and wherein the read request includes a command field, a row field, an address field and a sector field, wherein the command field indicates a read or write memory access, the address field specifies a GOB within the local memory, the sector field specifies a sector within the GOB, and the row field specifies a row within the GOB, the sector being a vertical portion of the GOB and the row being a horizontal portion of the GOB.

14. The display controller of claim 13, wherein the first row of data includes four pixels, and each pixel is represented using four bytes.

15. The display controller of claim 13, wherein the memory controller transmits data read from the local memory to the display controller through a data path, and the data path is sized such that only one row of data read from the local memory may be transmitted through the data path at a time.

16. The display controller of claim 13, wherein the read request further includes a command field set to indicate that the local memory is being accessed for a read operation.

* * * * *